United States Patent [19]

Sittre

[11] Patent Number: 4,669,550
[45] Date of Patent: Jun. 2, 1987

[54] ROTARY SCRAPER FOR PLANTER DISKS

[76] Inventor: Wayne R. Sittre, Star Rte., Box 16A, Castroville, Tex. 78009

[21] Appl. No.: 770,956

[22] Filed: Aug. 30, 1985

[51] Int. Cl.⁴ .................. A01B 15/16; A01B 23/06
[52] U.S. Cl. .................................. 172/559; 172/560; 111/88
[58] Field of Search ............... 172/558, 559, 560, 561, 172/562, 563, 564, 565, 566; 111/88

[56] References Cited

U.S. PATENT DOCUMENTS

| | | | |
|---|---|---|---|
| 240,993 | 5/1881 | Galt et al. | 172/559 |
| 336,711 | 2/1886 | Galt et al. | 172/559 |
| 381,908 | 5/1888 | Corbin | 172/559 |
| 523,508 | 7/1894 | Bauer et al. | 172/559 |
| 785,865 | 3/1905 | Davis | 172/560 |
| 808,021 | 12/1905 | Davis | 172/561 |
| 975,577 | 11/1910 | Shackelford | 172/559 |
| 1,260,752 | 3/1918 | Casaday | 172/559 |
| 1,321,040 | 11/1919 | Hoffman | 172/559 |
| 1,391,593 | 9/1921 | Sweeting | 172/559 |
| 1,480,161 | 1/1924 | Ford | 172/560 |
| 1,791,462 | 2/1931 | Bermel | 172/559 |
| 1,982,157 | 11/1934 | Gandrup et al. | 172/559 |
| 2,577,775 | 12/1951 | Lemmon | 172/763 |
| 4,206,817 | 6/1980 | Bowerman | 172/559 |
| 4,289,081 | 9/1981 | Koronka | 111/88 |

Primary Examiner—Richard J. Johnson
Attorney, Agent, or Firm—Cox & Smith Incorporated

[57] ABSTRACT

A rotary scraper for the exterior of planter disks which is mounted on a bracket easily attachable to existing grain planters. The rotary scrapers are mounted on the front edge of double disk planter disks vertically centered with the planter disks and with at least one half of the scraper disk outside the circumference of the planter disk.

4 Claims, 5 Drawing Figures

ROTARY SCRAPER FOR PLANTER DISKS

BACKGROUND OF THE INVENTION

The present invention relates to a scraping mechanism for planter disks. More particularly, it relates to a rotary scraper for scraping soil collecting on the outside of a double disk planter disk during operation.

In the field of grain planters, a problem encountered with planting grain using a disk-type double disk row planter is that of soil sticking to the disks. A double disk row planter is one in which a pair of rotating disks are mounted in tandem, at an angle, with the leading edge of the disks being angled towards each other. Viewed from the top, the two planter disks form a "V" shaped configuration. As the planter disks rotate, the leading edge of the "V" breaks the soil and pushes it to either side, to form a furrow. Immediately behind the leading edge, a grain tube is positioned to drop grain into the furrow at a predetermined rate. Normally, situated immediately behind the planter disks are a set of press wheels which press the furrow closed and seal the seed within the ground. If soil sticks to the interior or exterior of the disks, it can cause the furrow to become deformed by soil on the exterior of the disks increasing the width of the furrow. The collected soil can also form inside the "V" where it may catch seed dropping from the grain tube and prevent it from falling into the furrow, thus interfering with the seed spacing. Normally the soil collects on the interior of the double disks until either the disks stop turning all together, or it falls out in one large clump, dropping all of the collected seeds with it in one small area. To achieve consistent grain spacing, neither alternative is permissible.

Scrapers have been known in the art which are mounted to clean the planter disks to prevent the soil accumulation problems mentioned above. Also, scrapers have been known in the art of removing soil from plow disks, although the considerations are different in the field of scrapers for plow disks because there are no concerns with the furrow spacing or grain spacing, the only objective being to keep the plow disk turning to break the soil. However, the dirt can collect in the disks to the point where the disks stop turning.

Among the proposals for rectifying the problems relating to planter disks are those disclosed by the patents to David (U.S. Pat. No. 808,021) and Bowerman (U.S. Pat. No. 4,206,817). However, these references did not take into consideration problems relating to the proper size, mounting, shape and placement of the scrapers.

Generally, scrapers are of the wheel type, such as found in the Davis and Bowerman references, or are chisel type, with chisels or points which contact the accumulated dirt to scrape it loose. Chisel type scrapers may perform adequately in some situations, but when the soil being planted is highly compactible, dirt may compact on the planter disks underneath the chisel scraper to the point that the chisel is not able to scrape the dirt off the planter disks and the disks may stop turning. For this reason, it has been recognized that rotary scrapers are preferable, because they are capable of "slicing" the dirt off as they rotate in conjunction with the planter disk.

As stated, placement of the rotary scraper is important to proper operation. The references of Davis and Bowerman disclose rotary scrapers in which the axis of the scraper is on a different vertical plane than the axis of the planter disks. It is also noted that these two references also place the scraper disks on the rear of the planter disks instead of on the front. However, placing the rotary scrapers on the back of the planter disks may cause the dirt to fall into the press wheels and cause them to clog. Applicant has found it more desirable to place the rotary scrapers on the front side of the planters disks so that the dirt accumulated will fall off to the side or fall underneath the planter disks and press wheels, where they will not interfere with proper operation.

When placed on the front of the planter disks, the axis of the scraper disks should be in the same vertical plane as the axis of the planter disk in order to remove the dirt at the point furthest removed from the axle of the planter disk. This is desirable because it enables the rotary scraper to remove dirt at the point where it is least likely to drop into the axle of the planter disk and interfere with its rotation.

Another feature which is desirable on rotary scrapers is that they be located the proper radial distance from the axis of the planter disks. For example, the rotary scrapers disclosed in Bowerman and Davis show the axle of the rotary scraper to be fully inside the circumference of the planter disk. If dirt is accumulating only around the very edge of the planter disk, then this location may pose no significant problems because the rotary scraper can freely rotate. However, if dirt is accumulating several inches in from the edge of the planter disks, this means that the rotary scraper is contacting the accumulated dirt over substantially its entire diameter. When contact of this type occurs, the forces which cause the rotary scraper to rotate (i.e. contact of the rotary scraper along only its edge) cease to occur, and the rotary scraper will come to a stand still and merely act as a solid scraper, removing the dirt from the planter disk without rotating.

If the rotary scraper is positioned so that the scraper axle aligns with the edge of the planter disks, so that approximately half of the rotary scraper protrudes outside the edge of the planter disk, then it will be insured that the scraper will rotate regardless of the width of the band of dirt which is accumulated on the planter disks because the scraper will contact dirt along only $\frac{1}{2}$ of its circumference, at most, and this friction will cause the scraper to rotate.

A final consideration in the placement of rotary scrapers is the means of mounting them to the planter frame. Both Davis and Bowerman disclose spring loaded scrapers. However, in particularly hard compacting soil, the spring tension may allow soils to build up underneath the scraper as the spring gives way. In some instances, this can cause the planter disk to stop turning. Therefore, Applicant has found it desirable to mount the scraping means rigidly to the planter frame.

Further, in providing a rotary scraper for planter disks, it is desired that the scraper be designed as an attachment which can easily be added to most standard models of planters.

Therefore, it is an object of the present invention to remove soil from the disks of a planter while the disks are in motion to allow for proper operation of the planter.

Further, it is an object of the present invention that this removal of soil be done simply and effectively.

Further, it is an object of the present invention to provide a scraper adaptable to be added to most types of planters.

Other objects of the present invention are evident, or will become so, during the description of the preferred embodiment, which follows.

SUMMARY OF THE INVENTION

The present invention achieves these objects by providing a pair of scraper disks rotatably mounted on a support bracket, which is mounted to the frame of a planter, with the scraper disks being held in a spaced relationship by the support bracket in close proximity to the exterior of the planter disks. Rotation of the planter disks brings dirt into contact with the scraper disks, causing them to rotate and cut or jar accumulated dirt loose from the planter disks. The scraper disks may be rigidly mounted to the planter, preferably in the same vertical plane as the planter disk axis, and with approximately one-half of the scraper disk positioned outside the circumference of the planter disks.

DESCRIPTION OF THE PREFERRED EMBODIMENT

Figure 1:
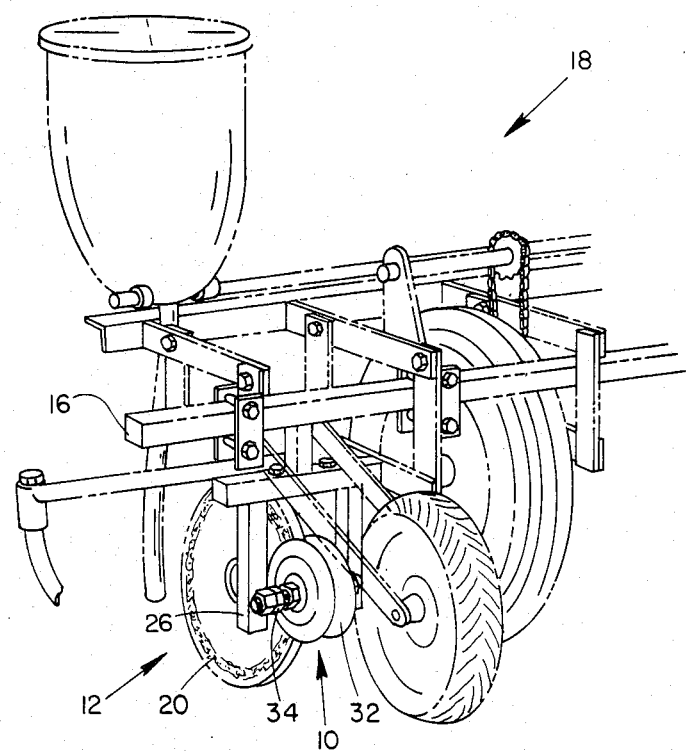
FIG. 1 is a front perspective view of the scraper assembly as mounted on a planter.
Figure 3:
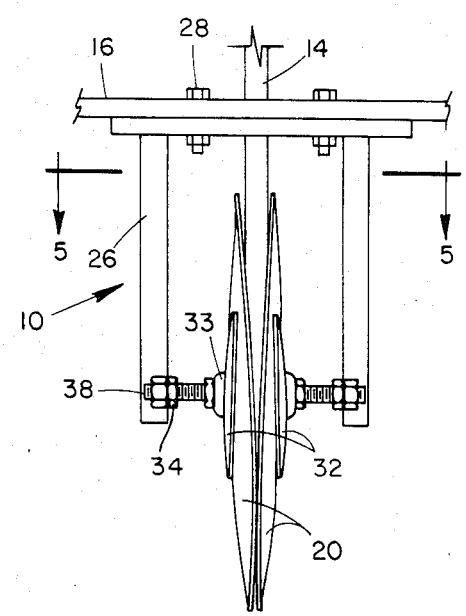
FIG. 3 is a front view of the scraper as installed on a pair of planter disks.
Figure 5:
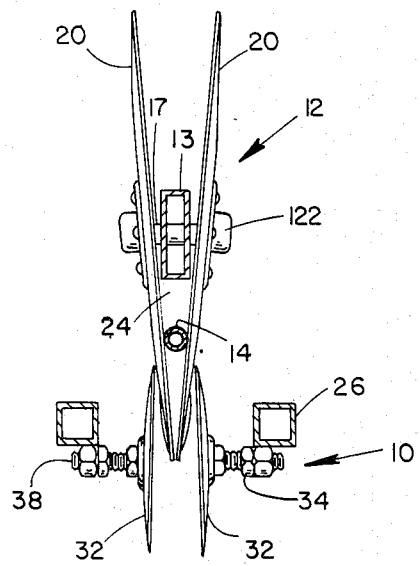
FIG. 5 is a top view of the scraper as installed on a pair of planter disks.

Referring first to FIG. 3, the scraper assembly, labeled generally as 10, is shown mounted on a planter near the planter disk assembly, labeled generally as 12. The planter disk assembly 12 is comprised of a support member 13 (shown in FIG. 5) attached to the frame 16 of the planter. A drill tube 14 is positioned to drive grain inside of the planter disks 20 immediately after the furrow is opened. The planter, labeled generally as 18, is shown in FIG. 1. The support member 13 is rigidly attached to the frame 16 (not shown in FIG. 3) and extends vertically downward towards the level at which the planter 18 would contact the ground. As shown in FIG. 5, a planter disk axis 17 is rigidly mounted to the support member 13. The planter disks 20 are mounted on the planter disk axis 17, so that they are angled toward one another in the direction of travel of the disks 20. The planter disks 20 are mounted on the planter disk axis 17 by bearings 22 operable to allow for free rotation of the planter disks 20. A drill tube 14 is mounted to drop seed in the area 24 in which the furrow created by the rotation of the planter disks 20.

Figure 2:
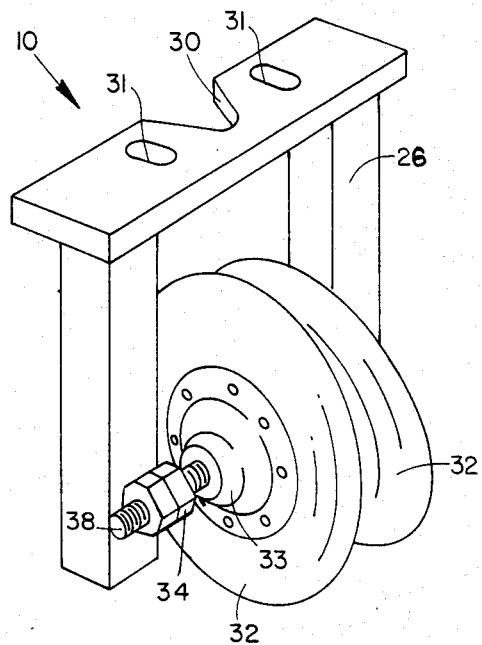
FIG. 2 is a side perspective view of the rotary scraper.

Returning to FIG. 3, the scraper assembly 10 is comprised of the support bracket 26 mounted to another portion of the frame 16. The support bracket 26 is mounted to the frame 16 rigidly by connecting means 28, which are preferably bolts. Many types of planters 18 are manufactured with holes in the frame 16 at standard intervals so that it is not usually necessary to drill holes in the frame 16 for insertion of the bolts 28. Further, the bracket 26, as shown in FIG. 2, is provided with a notch 30, so that the bracket 26 can be mounted to the frame 16 and fit around the drill tube 14. The bolts 28 would be mounted in the slots 31 shown in FIG. 2 so the scraper assembly 10 can be adjusted forwards and backwards in relation to the planter disks 20.

Looking at FIG. 2, a pair of rotary scrapers 32 are rotatably mounted to the bracket 26 by a pair of threaded axles 38. The axles 38 remain fixed relative to the bracket 26, and allow rotation of the scraper disks 32 on bearings 33 next to the scraper disks 32. In the present embodiment, the bearings 33 would be sealed bearings known in the art. The threaded axle 38 extends from the scraper disk 32 at substantially a right angle, as shown in FIG. 3.

Although the scraper disks 32 will be mounted so as to not actually touch the planter disks 20, the tolerance between the scraper disks 32 and the planter disks 20 should be relatively close, as shown in FIG. 5, to enhance the dirt removal capability. The tolerance can be adjusted by loosening the lock nut 34, and adjusting the threaded axle 38, and by adjusting the mounting of the bracket 26 in the slots 31. Applicant has found a tolerance of 8/1000 inch to 10/1000 inch to produce the best results.

Figure 4:
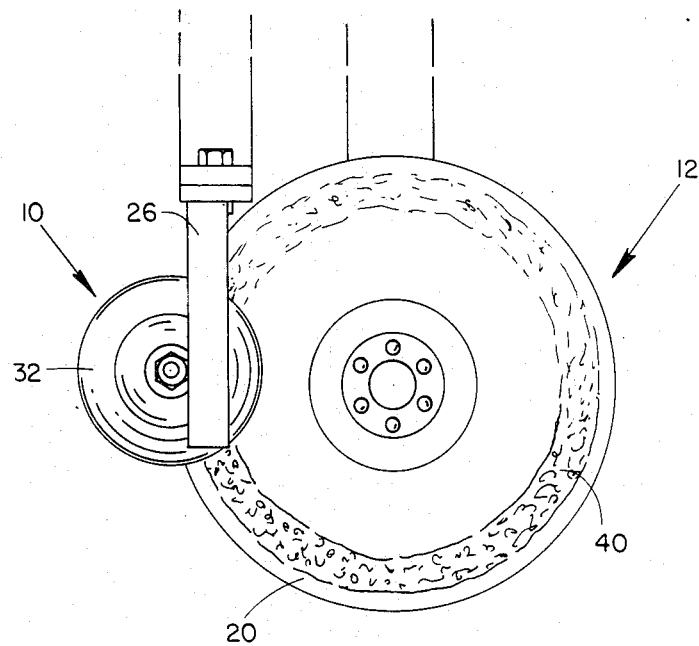
FIG. 4 is a side view of the scraper as installed on a pair of planter disks.

In operation, the scraper assembly 10 is mounted onto the frame 16 of a planter 18 with the notch 30 facing around the drill tube 14. As shown in FIGS. 3 and 4, the scraper axle 38 is in approximately the same horizontal plane as the planter disk axis 17. As shown in FIGS. 4 and 5, at least half the scraper area protrudes outside the circumference of the planter disk 20. As the planter disks 20 rotate, they will bring soil 40 along the outer edges of the planter disks 20. When the soil comes into contact with the scraper disks 32, they will likewise rotate, and the edges of the scraper disks 32 will cut or jar most of the accumulated soil from the planter disks' 20 outside and inside surface. The tolerance between the scraper disk 32 and the planter disks 20 is close enough that the planter disks 20 will have the great portion of the accumulated soil removed, and any remaining soil will be so small as to not interfere with the proper operation of the planter disks 20. The soil accumulated will normally not extend any further onto the planter disk 20 from the edge than the depth the planter 18 is running. Thus, if the planter 18 is running at the normal 3-3½" depth then a scraper disk of 6"-7" in diameter should be used.

Another important aspect of the present invention is the shaping of the scraper disk 32. As is shown partially in FIGS. 2, 3 and 5, the scraper disk 32 is slightly saucer shaped. The amount of curvature in the scraper disk 32 is important for several reasons. If the scraper disk 32 were completely flat, dirt would be built up between the scraper disk 32 and the planter disk 20 when used in highly compactible soils. Although this is partly offset by the rigid mounting of the bracket 26, Applicant has found that a flat scraper disk 32 will still allow soil to build up and eventually stop the planter disk 20 from turning. Placing a slight cup in the scraper disk 32 creates an angle that helps insure that dirt which has attached to the interior of the scraper disk 32 will fall away from the scraper disk 32 due to the forces of gravity and vibration from the rotation of the scraper disk 32. On the other hand, placing too much curvature in scraper disk 32 can have the same effect, because as the dirt is dislodged from the planter disk 20 it would accumulate on the exterior side of the scraper disk 32 to the point where the bracket 26 eventually fills with dirt and the planter disk 20 will stop rotating. Applicant has found that by placing a curvature so the saucer is approximately ⅛th inch in depth the scraper disk 32 will rotate and dislodge dirt from the planter disk 20 with a peeling effect. As the dirt 40 is peeled off the planter disk 20 it is cast off at an angle sufficient to clear the exterior of the scraper disk 32, and does not accumulate on the interior of the scraper disk 32 because of the slight cup, which works along with gravity and vibrational forces to dislodge the dirt.

The invention having thus been described, is now shown to one of ordinary skill in the art how to make and use the invention. However, the invention is not limited to this description of the preferred embodiment, but instead is limited only by the following claims.

I claim:

1. A scraper for planter disks wherein:
   said planter is comprised of at least two planter disks rotatably mounted in side-by-side relationship and angled towards each other so as to form a furrow upon rotation of said planter disks;
   a generally U-shaped support bracket adapted to be mounted on said planter;
   scraper disks rotatably mounted to said support bracket; and
   said scraper disks being adapted to be mounted in spaced relationship to said planter disks so as to be in close proximity to the exterior of said planter disks and so that at least one-half of said scraper disks extend beyond the circumference of said planter disks so that said scraper disks rotate about an axis which is substantially in the same horizontal plane as the axis about which the planter disks rotate.

2. The scraper as set forth in claim 1, wherein:
   said support bracket is comprised of a base member mounted to said frame and vertical members extending downward from said base member;
   said scraper disks being mounted on said vertical members; and
   said base member having a notch of sufficient depth to fit said base member around a drill tube.

3. The scraper as set forth in claim 2, wherein:
   said scraper disks are rigidly rotatably mounted to said support bracket.

4. The scraper as set forth in claim 1, wherein:
   said scraper disks are saucer-shaped and are further mounted at an angle relative to said planter disks so that the edge of said scraper disks faces the exterior of said planter disks.

* * * * *